United States Patent [19]

Runge

[11] 4,182,217
[45] Jan. 8, 1980

[54] STRADDLING DOWEL CONSTRUCTION

[75] Inventor: Erich Runge, Kunzelsau, Fed. Rep. of Germany

[73] Assignee: Albert Berner, Kunzelsau, Fed. Rep. of Germany

[21] Appl. No.: 870,629

[22] Filed: Jan. 19, 1978

Related U.S. Application Data

[63] Continuation of Ser. No. 749,697, Dec. 13, 1976, abandoned.

[30] Foreign Application Priority Data

Dec. 23, 1975 [DE] Fed. Rep. of Germany ....... 2558459

[51] Int. Cl.² ............................................. F16B 13/04
[52] U.S. Cl. ......................................................... 85/71
[58] Field of Search ................... 85/69, 70, 71, 72, 73, 85/74, 75, 76, 83, 84

[56] References Cited

U.S. PATENT DOCUMENTS

| | | | |
|---|---|---|---|
| 750,536 | 1/1904 | Haggerty | 85/75 |
| 1,120,412 | 12/1914 | Rohmer | 85/71 |
| 2,148,977 | 2/1939 | Buck | 85/71 |
| 3,000,254 | 9/1961 | Hottenstein | 85/75 |
| 3,143,916 | 8/1964 | Rice | 85/71 |
| 3,313,083 | 4/1967 | Flora | 85/70 |
| 3,919,917 | 11/1975 | Thorsman | 85/74 |
| 3,974,735 | 8/1976 | Berner | 85/72 |

FOREIGN PATENT DOCUMENTS 1178019 12/1958 France ............................................. 85/71

*Primary Examiner*—Thomas J. Holko
*Attorney, Agent, or Firm*—Edwin E. Greigg

[57] ABSTRACT

A straddling dowel for securing a threadable element such as a bolt or a screw, comprises a substantially cylindrical body of a plastic material. The body includes a tubular neck portion and an expanding wedge portion which is held outwardly from the neck portion by a plurality of longitudinally extending bending straps connected between the neck portion and the expanding wedge portion. A straddling leg is disposed between adjacent bending straps and extends longitudinally between the neck portion and the wedge portion and it is provided with a wedging surface which faces a similar wedging surface of the wedge portion. When a bolt or a screw is inserted into the neck portion and threaded into the wedge portion, the wedge portion is pulled toward the neck portion to either effect the outward deflection and separation of the straddling legs so that they move outwardly and interengage with the holding material, in the case where the holding material is of a thick construction and consists of a crumbly material, or they bend outwardly during the inward movement of the wedge portion toward the neck portion to form laterally extending holding abutments.

5 Claims, 8 Drawing Figures

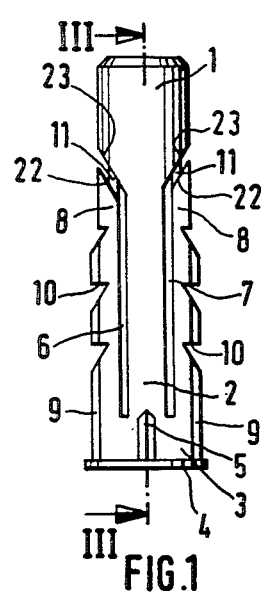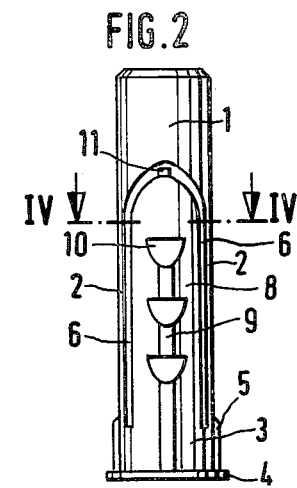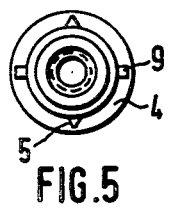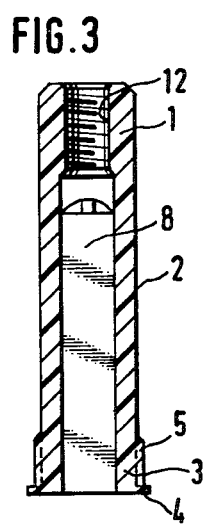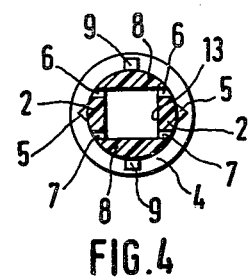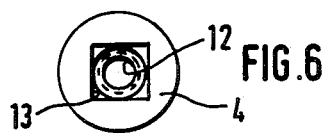

STRADDLING DOWEL CONSTRUCTION

This is a continuation of application Ser. No. 749,697 filed Dec. 13, 1976 now abandoned.

FIELD AND BACKGROUND OF THE INVENTION

This invention relates in general to the construction of dowels and, in particular, to a new and useful dowel construction which includes a plastic dowel having a neck portion and a wedge portion held to the neck portion by a plurality of bending strips which extend longitudinally between the neck and the wedge portion and which also includes straddling legs between the bending strips which have wedge surfaces which cooperate with wedge surfaces of the wedge portion to cause the outward deflection of the bending strips and which may be connected to the wedge portion so as to bend when the securing surface does not facilitate the outward deflection.

DESCRIPTION OF THE PRIOR ART

The invention is particularly concerned with a substantially cylindrical slotted straddling dowel of plastic, traversed by a cavity extending in an axial direction, with an expanding wedge, containing a bore for a fastening element to be screwed-in, extruded in one piece with the other dowel parts, and arranged at the inserting end of the dowel and includes a closed neck at the rear end. Straddling dowels of this type are known from German Design Pat. No. 7,129,315.

The invention is based on the problem of developing straddling dowels of this type so that they can be used like straddling dowels without special expanding wedges within a fitting hole, but also for fastening objects on plates which are held in a distance from a structural part both on thick boards, where a dowel inserted into a fastening hole projects only slightly at the back over its thickness and, on thin boards, where the dowel projects a considerable amount over its back and even in the case of boards of soft construction materials, such as wood fiber boards, where the insertion holes on the back of the board are frequently wider than on the front side, because the soft material crumbles out from the back when the holes are filled.

SUMMARY OF THE INVENTION

According to the invention, an expanding wedge portion is connected with the neck portion of a cylindrical dowel body by band-shaped bending straps which are integral with these two parts and which extend over the length of the dowel surface. Straddling legs extending over the length of the dowel surface are separated by slots laterally bounding these bending strips or straps. Beveled surfaces are provided at the ends of the bending straps adjoining the expanding wedge to cooperate with wedge surfaces of the expanding wedge.

The desired universal applicability of the dowel is achieved because the bending straps, which bear on the back of boards in the bent state on the straps are combined with straddling legs which can be spread particularly far apart by an expanding wedge, inside a dowel extruded of plastic. The arrangement of bending straps in dowel sleeves consisting preferably of metal for screws with machine threads and nuts is known, for example, from French Pat. No. 1,278,641, while the forced spreading of the straddling legs is effected by means of a wedge, e.g., in the above-mentioned Design patent.

In accordance with a further aspect of the invention, reinforcing strips, which are known per se and which extend parallel to the longitudinal axis of the dowel, are provided on the outside of the straddling legs and are toothed at least in the central portion of the dowel length by cutouts and extend also over the neck of the dowel which carries in the extension of the bending straps known outer fins over its own length.

Toothed reinforcing strips on the surface of plastic straddling dowels have already been suggested by the inventor in his German Pat. Application No. P 24 32 211.0 and the inventor has since supplied dowels with such strips.

In a further development of the invention, the ends of the straddling legs adjoining the inserting hole of the dowel are connected by safety straps produced by integral extrusion with the expanding wedge in a position holding it within the circular cylinder circumscribing the dowel.

Similar safety straps were also provided in the above-mentioned Design Pat. No. 7,129,315 which concerns, however, a straddling dowel without bending straps. The retention of the straddling legs within the circular cylinder circumscribing the dowel permits not only the unhindered insertion into the holes, but also, if there is no neck flange provided, the so-called through-assembly where a dowel is pushed through a hole in a part attached to another part and is inserted into another hole receiving it in the lower part.

With a further embodiment of the invention, the longitudinal slots bounding the bending straps overlap with the neck fins. In this embodiment, the bending straps are stiffened in the region adjoining the neck, so that they bend out at the beginning of the bending process in the middle of their length with greater safety. Otherwise, the bending straps would bend at a point closer to the neck provided the board to be held in front of a structural part is so thin that the starting point of the bending straps on the neck of the dowel at the back of the board protrudes from the dowel.

Preferably, the cavity traversing the dowel in the longitudinal direction has a rectangular, particularly square, cross-section, which is constant over its entire length, with the width of the bending straps, together with the widths of the elongated slots bounding the bending straps, being equal to the length of the side of the rectangle or square of the cross-section. As long as the straddling legs are not spread and the bending straps are not bent, a prismatic cavity formed this way provides a good straight guide for a screw to be screwed in, whose turns, as far as the dowel surface parts cannot yield within a hole, cut into the prism surface, while there is sufficient room for receiving excess material to be displaced along the prism sides.

Accordingly, it is an object of the invention to provide a dowel construction, which comprises a substantially cylindrical body of plastic material, having a tubular neck portion and a substantially cylindrical expanding wedge connected to the neck portion by a plurality of bending strips which extend longitudinally and which includes straddling legs disposed between adjacent bending strips which extend longitudinally outwardly from the neck portion and terminate in wedge surfaces opposite to wedge surfaces on the wedge portion, which surfaces cooperate to produce an outward deflection of the straddling legs during securement of the threadable element into the dowel.

A further object of the invention is to provide a straddling dowel construction, which is simple in design, rugged in construction, and economical to manufacture.

The various features of novelty which characterize the invention are pointed out with particularity in the claims annexed to and forming a part of this disclosure. For a better understanding of the invention, its operating advantages and specific objects attained by its uses, references should be had to the accompanying drawing and descriptive matter in which there are illustrated preferred embodiments of the invention.

BRIEF DESCRIPTION OF THE DRAWINGS

In the Drawings:

FIG. 1 is a side elevational view of a dowel constructed in accordance with the invention;

FIG. 2 is a view similar to FIG. 1, but turned by 90° about a longitudinal axis;

FIG. 3 is a section taken along the line III—III of FIG. 1;

FIG. 4 is a section taken along the line IV—IV of FIG. 2;

FIG. 5 is a top view of the dowel shown in FIG. 1;

FIG. 6 is a bottom plan view;

DESCRIPTION OF THE PREFERRED EMBODIMENTS

Figure 7:
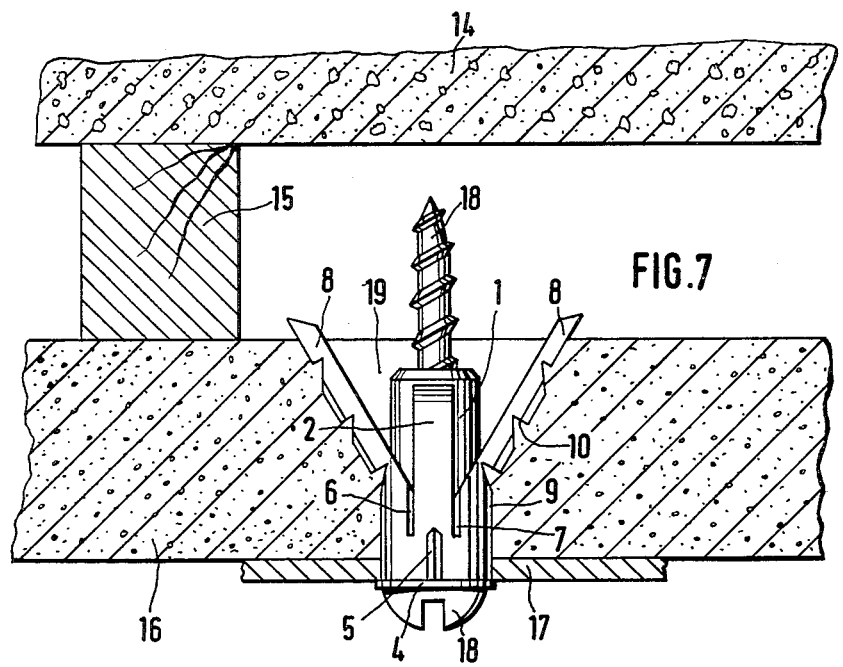
FIG. 7 is a sectional view through a wall structure having a dowel inserted therein in accordance with one embodiment of the invention.

Referring to the drawings in particular, the invention embodied therein, comprises a tubular dowel body made of a plastic material which includes an expanding wedge portion 1 of cylindrical form having a threadable bore or hole 12 therein which aligns with a bore through a remaining portion which includes a neck portion 3 of tubular form held to wedge portion 1 by bending straps 2. Bending straps 2 are separated by straddling legs 8 and straddling legs 8 have wedge-shaped surfaces 22 which cooperate with wedge-shaped surfaces 23 to effect outward deflection of these legs during insertion of a threadable securing element, such as a bolt or a screw, into the dowel.

In the embodiment shown, the expanding wedge 1, arranged at the inserting hole of the dowel body, is connected by two diametrically opposite bending straps 2, 2 with the closed neck portion 3 of the dowel, which has a flange 4, preventing it from passing through a fitting hole. On the neck portion are arranged diametrically opposed fins 5. Bending straps 2 are bounded on the right and left by elongated slots 6 and 7 which extend up to the dowel neck and overlap the neck fins 5. Slots 6 and 7 separate straddling legs 8 which oppose each other like the bending straps 2, but are offset by 90° relative to the straps. Legs 5 have a segment shaped cross-section (FIG. 4). On the straddling legs 8 are arranged reinforcing strips 9, which extend in the longitudinal direction of the dowel surface beyond its central portion toward the inserting hole, comparable to the neck fins in their part adjoining flange 4, and are toothed in this central portion by cutouts 10. The cutouts or beveled teeth 10 have steep front edges on the sides of the cutouts facing the inserting end, while the cutout boundary edge rises gradually toward the opposite dowel end. At their ends facing the expanding wedge 1, the straddling legs 8 are connected with the spreading wedge 1 by safety straps 11 and they form at these ends, beveled surfaces 22 which cooperate with wedge surfaces 23 on the expanding wedge 1, when the latter is pulled by an entering screw or bolt 18 (FIGS. 7 and 8) toward the rear end of the dowel into the latter, and the safety straps 11 are destroyed.

A hole 12 into which a screw can be inserted is provided in expanding wedge 1. In the embodiment presented, the hole is threaded so that it can also be used for screwing-in of a screw or bolt with a machine thread. Wood screws also can be screwed-in through a hole provided with machine threads, because the sharp edges of their turns dig into the wall of the hole even if the machine screw pitch of the thread provided in the hole does not correspond to the pitch of a wood screw. The threads in the hole act then as shoulders which facilitate the action of the threads of a wood screw.

The cavity traversing the dowel in a longitudinal direction is a four-edged cavity, in the represented embodiment square. The side of the square is as long as, and corresponds to, the sum of the widths of a bending strap 2, and of a slot 6 and 7 each (see FIG. 4).

In the embodiment according to FIG. 7, a thick board 16 is arranged in front of a structural part 14, held by a spacer 15, in a distance from the latter in front of which an apparatus part 17 is secured by means of a wood screw 18, and of a dowel designed in the above described manner, according to the invention. It is assumed that board 16 consists of an easily crumbly material, so that hole 19 is greatly widened toward the rear of board 16. By tightening expanding wedge 1, bending straps 2 are not only bent so far that they bear on the wall of the widening hole 19, but the straddling legs 8 are also bent by the expanding wedge 1 to such an extent that their toothed reinforcing strips 9 press into the hole wall, so that the part 17 is retained.

Figure 8:
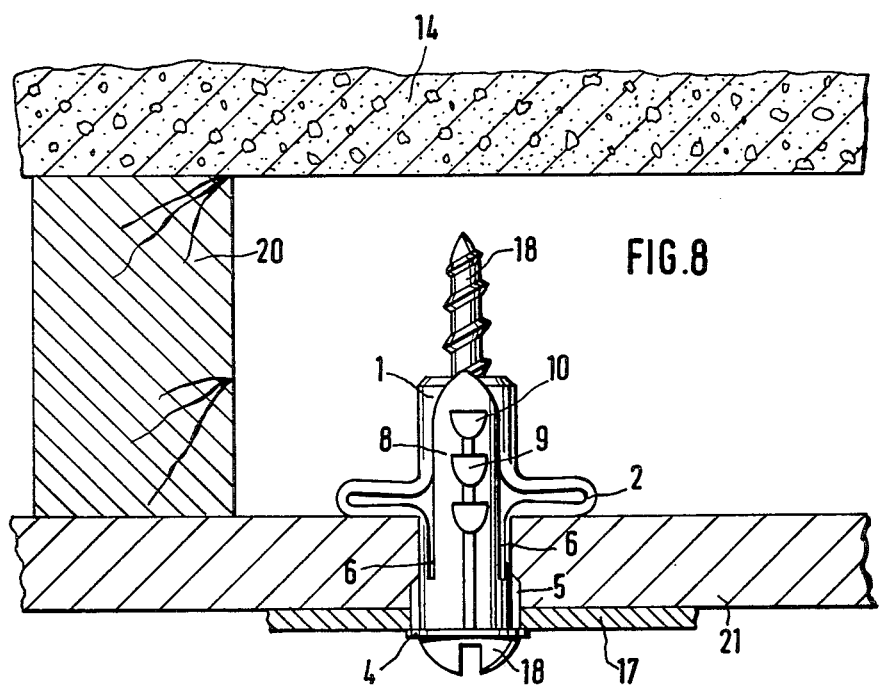
FIG. 8 is a view similar to FIG. 7 indicating a different application of the dowel for a thinner board.

In the embodiment according to FIG. 8, a thin board 21 of harder material is held by means of a spacer 20 at a distance from structural part 14 so that the fastening hole on the back of the board is not widened. In this case, straddling legs 8 only bear lightly on the hole wall under the action of expanding wedge 1. The bending straps 2, however, bear in their bent position, flat against the back of board 21, so that the apparatus part 17 is held firmly.

Particularly in dowels with a larger diameter, more than two bending straps 2 and/or more than two straddling legs 8 can be provided by additional slots, as they exist in the represented embodiments.

While specific embodiments of the invention have been shown and described in detail to illustrate the application of the principles of the invention, it will be understood that the invention may be embodied otherwise without departing from such principles.

What is claimed is:

1. A straddling dowel comprising, in combination, an elongated tubular body of circular cross-sectional shape and having a side wall defining a central bore, said body including a neck portion at one end and an expanding wedge portion at the other end, a pair of bending straps arranged in diametrically opposed relationship on said body and connected at opposite ends to said neck portion and said expanding wedge portion, said bending straps having an outer surface coincident with the outer surface of said body side wall, a pair of wedge surfaces on said expanding wedge portion extending between the adjacent ends of said bending straps in diametrically opposed relationship with adjacent ends of said wedge surfaces defining a junction between said adjacent ends of said bending straps and said expanding wedge portion, a pair of leg portions each extending longitudinally of said dowel between the adjacent side edges of said bending straps and having a length which is substantially the same as said bending straps, said straddling leg portions having side edges disposed in closely spaced relationship with the side edges of said bending straps to define a slot and being connected at one edge to said neck portion, the other end of said straddling leg portions being provided with a wedge surface corresponding to the respective wedge surface on said expanding wedge portion in closely spaced relationship therewith, said straddling leg portions having an outer surface coincident with the outer surface of said body side wall, and means on the portion of said central bore within said expanding wedge portion for engagement with a fastening element inserted through said neck portion to move said expanding wedge portion toward said neck portion wherein said bending straps are folded radially outward and said straddling leg portions are pivoted laterally outward by wedging engagement of said wedge surfaces on said expanding wedge portion successively with the wedge surfaces and the inner surfaces on said straddling leg portions for fixedly securing said dowel in an insertion hole or the like.

2. A dowel construction in accordance with claim 1 including a reinforcing strip on each of said straddling leg portions extending upwardly from the outer surface of said straddling leg portions longitudinally of said dowel, said reinforcing strip being provided with tooth formations at spaced locations along its length and a plurality of circumferentially spaced, upwardly projecting fins on the outer surface of said neck portion.

3. A dowel construction in accordance with claim 2 wherein said reinforcing strips extend from said neck portion up to the middle portion of the dowel towards said expanding wedge portion.

4. A dowel construction in accordance with claim 1 including a safety strap connection between said straddling leg portions and said expanding wedge portion, said dowel being formed in a one-piece construction of molded plastic material.

5. A dowel construction in accordance with claim 1 wherein said central bore portion within said expanding wedge portion is internally threaded for engagement with an externally threaded fastening device for moving said expanding wedge portion toward said neck portion.

* * * * *